Jan. 8, 1929.  B. COX  1,698,188
AGRICULTURAL IMPLEMENT
Filed Dec. 27, 1927   2 Sheets-Sheet 1
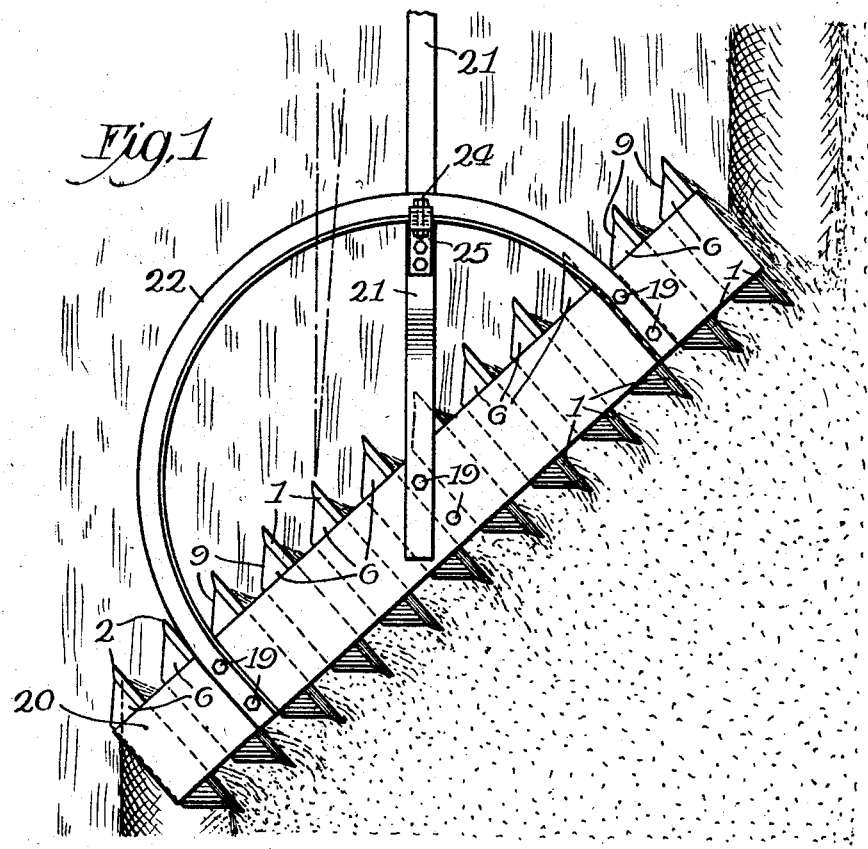
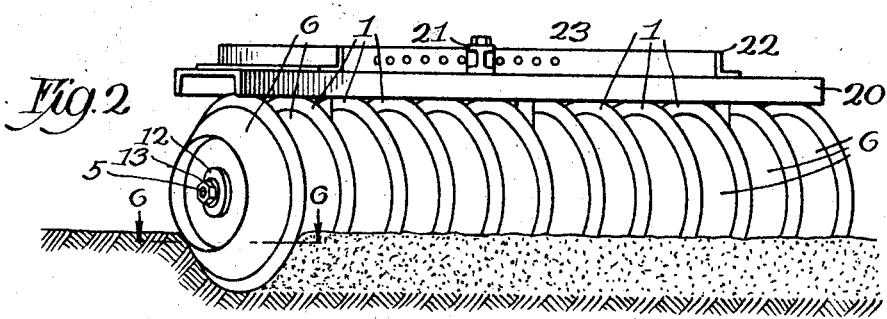
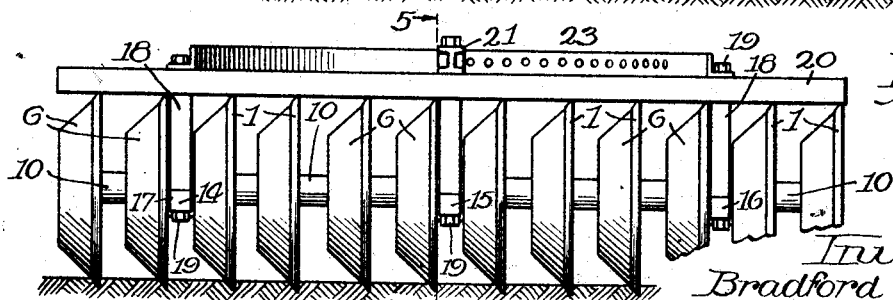
Inventor
Bradford Cox Jan. 8, 1929.
B. COX
1,698,188
AGRICULTURAL IMPLEMENT
Filed Dec. 27, 1927
2 Sheets-Sheet 2
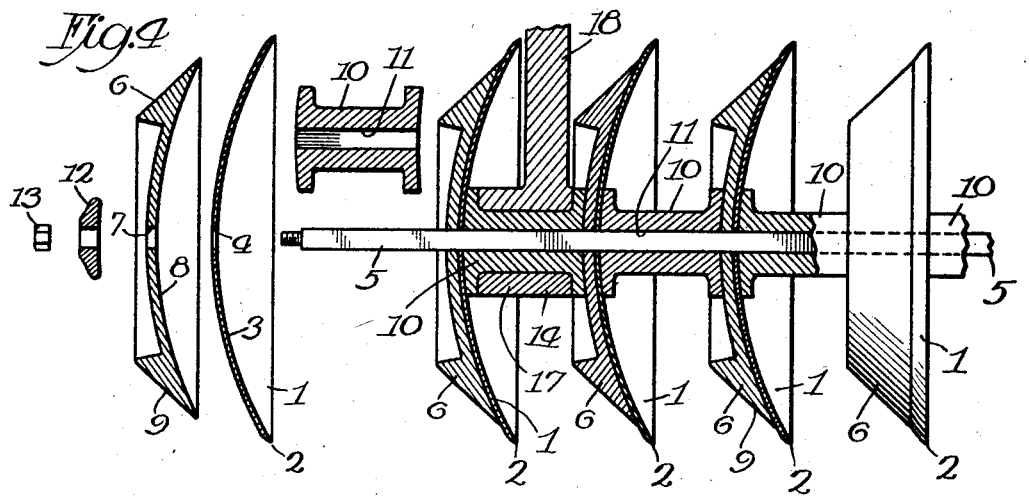
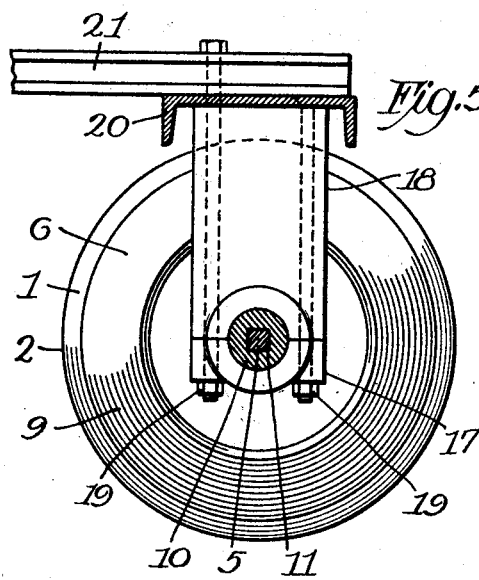
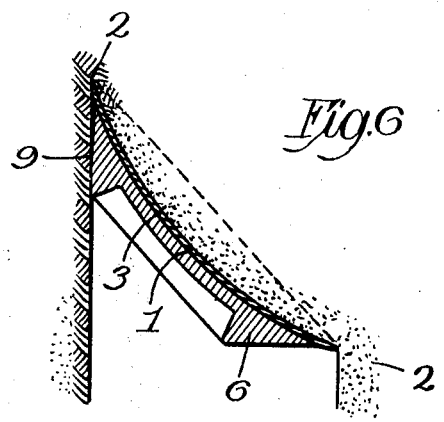
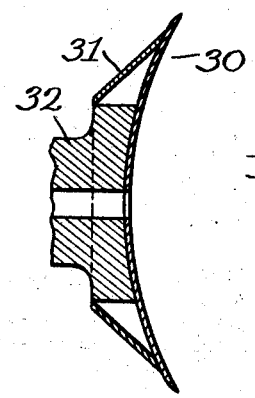
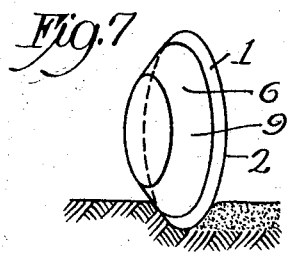
Inventor
Bradford Cox Patented Jan. 8, 1929.

1,698,188

UNITED STATES PATENT OFFICE.

BRADFORD COX, OF PLAINVIEW, TEXAS.

AGRICULTURAL IMPLEMENT.

Application filed December 27, 1927. Serial No. 242,626.

This invention relates to agricultural implements. It concerns a marked development in the construction of rotary implements such as disk plows, disk harrows and the like by means of which they may be greatly simplified and improved. It is applicable particularly to disk plows of the cylinder type wherein a plurality of disks are mounted on a common shaft so as to rotate in unison, but it may also be used with other types of disk plows, with disk harrows, disk cultivators, and other devices wherein a circular disk having a concave face is used for stirring or turning over the soil by pulling the disk through the soil while it is located at an angle to the line of draft, such action resulting in the turning of the disk and in moving the soil across the concave face of the disk.

One of the chief difficulties with rotary implements of this kind is the counterbalancing of the side thrust on the implement as it is pulled through the ground. The disk or disks are located at an angle such that the reaction of plowing tends to cause the plow to skew or slide to one side. The standard practice is to supply the plow with a number of very heavy wheels, the weight of which tends to prevent side slip. These wheels are often positioned at an angle to the vertical so as to get a better grip on the ground to prevent sliding of the plow. Three wheels are usually employed and the provision of these requires the provision of a corresponding number of axles, adjusting levers and frame parts. While they serve with some success in preventing a plow from moving sideways they are clumsy, and unsatisfactory. The many parts make the plow expensive; they add very materially to the weight of the plow and this increases the power required to pull the plow over the ground, thus increasing the cost of operation; and they increase the space occupied by the plow, thereby making it unwieldy and awkward to handle, particularly when it is so heavy. However, these extra parts have been considered necessary, and practically every disk plow now on the market has them in some form.

The present invention comprehends the elimination of the wheels, axles and extra parts, and the absorption of the side thrust by means of a rolling landside associated with each disk. The landsides or the parts associated with them are made sufficiently heavy to provide the proper weight for causing penetration of the plow and hence no added parts are necessary for this purpose. The result is an extremely simple, compact construction that is not only less expensive to produce, but it is also less expensive to operate and much easier to handle than the old type of plow.

The general object of the invention is, therefore, to provide an improved rotary disk implement.

A more particular object is to provide an improved agricultural implement of the rotary disk type in which each disk is provided with a rolling landside for absorbing the side thrust on the implement.

A further object is to provide an improved plow of the so-called one-way disk plow or cylinder disk plow type having a plurality of disks that rotate in unison, said plow being wheel-less and having a plurality of rotary landsides for absorbing the side thrust on the plow.

Other objects and advantages of the invention will appear from the specification and drawings.

An embodiment of the invention is shown in the accompanying drawings in which:

Fig. 1 is a plan view of a cylinder disk plow embodying the invention;

Fig. 2 is a rear view of the same in plowing position;

Fig. 3 is a rear view of the plow in transport position;

Fig. 4 is a partial rear elevation and section showing some of the parts spread apart in order to illustrate clearly how they are assembled;

Fig. 5 is a vertical section on the line 5—5 of Fig. 3;

Fig. 6 is a horizontal section on the line 6—6 of Fig. 2;

Fig. 7 is a rear view of one of the disks showing the position it occupies when the plow is being used to plow to only a shallow depth;

Fig. 8 is a section of a modified form of disk.

The invention is illustrated in connection with a disk plow of the so-called one-way or cylinder type, that is, a plow in which a plurality of cutting disks are mounted on a common shaft so that all of them rotate in unison when the plow is being pulled over the ground.

The cutting disks 1, which are best illustrated in Fig. 4, are preferably made of relatively thin sheet steel and each has a circular cutting edge 2 and a concave face 3. The concavity or "cupping" of the disks may be varied to suit the requirements, a satisfactory construction for the type of plow illustrated being a cupping of about 2¾ inches on a disk 20 inches in diameter. This type of disk is well known in the art, being used on disk plows, disk harrows, disk cultivators and similar implements where disks are drawn over the ground while positioned at an angle to the line of draft. Each of the disks in the plow illustrated is provided with a square central opening 4 to permit it to be assembled on a square shaft 5 illustrated in Fig. 4. Any desired number of disks may be mounted on the shaft, as the invention is independent of the number of disks, said number depending upon the size of the plow desired. It will be obvious that all the disks will turn together and that the turning of one will tend to turn the others. Likewise if one of the disks should strike an obstruction it will not stop rotating because it will be turned forward by the rotating force of the other disks on the shaft.

Ordinarily a plow of this general type is furnished with an expensive frame, with several axles and adjusting means for each, and with several supporting wheels of heavy weight, all of which parts are supplied in order to absorb the side thrust. Also expensive thrust bearings are employed for absorbing the end thrust of the disk shaft. Thrust bearings must be provided for the wheels also. The thrust from the disks is transmitted to the disk shaft, to the thrust bearings, to the frame and through the axles to the wheels, thereby subjecting the whole plow to a heavy strain. All these expensive, heavy and cumbersome parts are eliminated in the present invention by the provision of a rolling landside for each disk which absorbs the side thrust for its own disk at the point where the side thrust occurs, thereby relieving the shaft of side thrust and making the use of thrust bearings, frames, axles and wheels unnecessary. These rolling landsides are constructed in such a way that they can be conveniently and easily mounted on the shaft 5 that carries the cutting disks and so that the whole plow may be inexpensively produced and easily assembled.

Each of the rolling landsides 6, illustrated in Fig. 4, comprises a heavy circular plate or disk having a square central opening 7 by means of which it may be mounted on the square shafts 5. Each landside has a concave face 8 shaped to fit the rear side of its cutting disk 1 so that when the landsides are assembled at the rear of the cutting disks they will fit closely against them. Each of the landsides has a peripheral surface 9 forming a substantial angle with the face of its cutting disk when the landside is assembled adjacent the disk. This peripheral surface forms a rolling landside surface which contacts the wall of the furrow cut by the disk as illustrated clearly in Figs. 1, 2, 6 and 7. As the plow is pulled over the ground the disks rotate and each cuts its own furrow as illustrated in Fig. 1. As the disks rotate the rolling landsides rotate with them and the surfaces 9 contact the walls of the furrows in the manner illustrated in Fig. 6, which is a cross section on the line 6—6 in Fig. 2. Each rolling landside thus absorbs the side thrust of its individual disk and there is very little if any side thrust on the shaft 5. These landsides act no matter whether the plow is plowing a shallow furrow or a deep furrow, because the landside contacts the curved wall of the furrow at the forward lower portion of the landside and it moves down into the furrow along with its disk, that is, as the disk cuts deeper the landside sinks with the disk and if the disk cuts shallow, the landside moves to a shallow position, but, nevertheless, is against the wall of the furrow.

The cutting disks and landsides are assembled on the square shaft 5 with spaced collars 10 between them, each of said collars having a square opening 11 for receiving the shaft 5. The parts are proportioned so that the edges of the cutting disks are preferably about seven inches apart, but this spacing can be varied if desired.

After the parts are assembled on the shaft they are held in position by a washer 12 and a nut 13, there being a set of these for each end of the shaft. This manner of constructing the parts permits each of them to be easily manufactured in an inexpensive way and it also makes the plow easy to assemble or to take apart for the repair or replacement of any one of the parts. It is merely necessary to slip the cutting disks, the landsides and the spacing collars on the shaft in the proper sequence and then tighten the nuts 13 on the ends of the shaft after the washers 12 have been put in place. The plow may be taken apart by loosening the nuts and removing the disks, spacing collars and landsides, any one of which is then free to be repaired without having to carry the whole plow about. It will be understood that the landsides could be made integral with the cutting disks if desired, but the construction illustrated is the preferred form, because it permits the use of a standard type of cutting disk which may be replaced without requiring simultaneous replacement of the landsides.

Mounted on the shaft 5 are three simple bearings 14, 15 and 16 illustrated in Figs. 3 and 5. All of the bearings are alike so only one of them will be described. Referring to Fig. 5, the bearing has a lower half 17 and an upper half 18 forming a standard projecting vertically upward. The two halves are clamped together about the collar 10 which may be machined if desired, by means of bolts 19. This provides a convenient assembly that permits easy disconnection of the parts by simply turning the plow backward until the nuts on the ends of the bolts are exposed whereupon they may be removed and the disk shaft freed from the bearings. The standards 18, of which there are three, (Fig. 3) support a cross member 20 preferably made out of a standard channel beam, the standards being held to the channel by the same bolts 19 that hold the bearings in place. Pivoted to the cross member 20 at the center of the plow is a draft bar 21 which extends forwardly for connection to the draw bar of a tractor. This draft bar is adjustably held in angular position relative to the axis of the plow by means of a semi-circular angle bar 22 having a plurality of openings 23 (Fig. 2) for receiving a bolt 24 that extends through openings in a bracket 25 on the bar 21 and through the openings 23 in the semi-circular bar 22. These parts provide simple draft connections for pulling the plow which may be easily adjusted so as to vary the angle of the axis of the plow relative to the line of draft. The normal position of the parts is illustrated in Fig. 1 where it will be observed that the surfaces of the rolling landsides are at a slight angle to the line of draft as shown by the dot and dash lines. When it is desired to plow quite deep the draft connections are adjusted so that the axis of the plow is at a very considerable angle to the line of draft and, when shallow plowing is desired, the parts are adjusted so that the angle is less. When it is desired to transport the plow the draft connections are adjusted so that the axis of the plow is at right angles to the forward motion of the plow in which case the disks occupy the position illustrated in Fig. 3. The rolling landsides have the added advantage that, in transport position of the plow, they prevent the disks from penetrating the soil to as great an extent as they otherwise would and thus make it easier to transport the plow about without cutting up the ground. The exact construction of the draft connections may be varied, and a different type of adjusting means may be employed, but the form illustrated has been found satisfactory, and it will be observed that the construction provides a simple type of draft connection in which the parts are high above the ground so as to clear obstructions such as weeds, stocks, etc., that may be in a field that is being plowed.

The rolling landside surface at the rear of each disk may be provided in a number of different ways and one modification is illustrated in Fig. 8. In this modification the cutting disk is of the same general construction as the cutting disk heretofore described, but instead of providing a landside surface by the utilization of a heavy casting mounted behind the disk, said surface is provided by welding or otherwise attaching to the rear of the disk a cylindrical landside 31 made of thin sheet metal. With this construction the weight for causing penetration of the disk may be provided by using a heavy metal sleeve or casting 32. In the event such sleeve is not desired it can be omitted and the weight for causing penetration of the plow can be obtained by putting weights on top of the cross member 20.

With the construction thus provided a cylinder plow of extremely simple and inexpensive nature is produced. It is devoid of all wheels, axles and complicated or large frame constructions. It is compact, relatively light, and easy to handle. It is not necessary to employ expensive thrust bearings as the side thrust on the plow is absorbed by the walls of the furrows of each of the disks, thereby avoiding putting a strain on the plow. The rolling landsides perform the double function of absorbing the side thrust and of providing weight for causing the disks to penetrate the ground. The disks and the landsides rotate together so that there is always a landside surface presented to the furrow wall for absorbing the side thrust. As the plow is pulled over the ground it pulverizes it efficiently to provide a fine seed bed for the planting of wheat or similar crops.

Although the invention has been illustrated and described in connection with a disk plow of the so-called one-way or cylinder type, it will be clear that it can be used with rotary implements of other types such, for example, as disk plows having one or more plowing disks rotating independently of one another, or with disk harrows having one or more gangs of disks, or with disk cultivators or similar implements employing rotary disks for turning or stirring the soil. In each of these implements there is a very considerable side thrust caused by the angular position of the disk in the soil. By using the rolling landside herein disclosed this thrust is absorbed by the side wall of the furrow cut by the disk so that there is little, if any, tendency of the implement to which the disk is connected to skew or skid sideways.

It is to be understood that the construction shown is for purposes of illustration only and that variations may be made in it without departing from the spirit and scope of the invention as defined by the appended claims.

I claim:

1. A rotary agricultural disk having a concave face, a circular cutting edge, and a circular landside surface adapted to rotate with the disk, said landside surface being at a substantial angle to the face of the disk so as to bear against the wall of the furrow cut by the disk to absorb the side thrust.

2. A rotary earth working disk having a concave face, a circular cutting edge, and a circular rear surface forming a substantial angle with the face of the disk to form a rolling landside adapted to contact the wall of the furrow cut by the disk to absorb the side thrust, there being sufficient material associated with said disk to cause it to penetrate the soil.

3. The combination with an agricultural disk adapted to rotate and to stir the soil when pulled thereover while positioned at an angle to the line of draft, of a rolling landside associated with the disk and rotatable therewith, said landside having a surface for engaging the side of the furrow cut by the disk to absorb the side thrust.

4. The combination with an agricultural disk adapted to rotate and to stir the soil when pulled thereover while positioned at an angle to the line of shaft, of a rolling landside on the rear of said disk, said landside being rotatable with the disk and having a surface engaging the side of the furrow cut by the disk to absorb the side thrust.

5. The combination with a circular concave metal disk adapted to rotate and to stir the soil when being pulled thereover while positioned at an angle to the line of draft, of a rolling landside at the rear of the disk mounted to rotate therewith, said landside having a surface at a substantial angle to the face of said disk to bear against the wall of the furrow cut by the disk to absorb the side thrust, said rolling landside being of sufficient weight to cause the disk to penetrate the soil to a substantial depth.

6. The combination with a relatively thin metal disk having a circular cutting edge and a concave face, said disk being adapted to rotate to stir the soil when being pulled thereover while positioned at an angle to the line of draft, of a heavy circular metal disk abutting the rear of the cutting disk, said heavy disk having a peripheral surface forming a substantial angle with the face of the cutting disk to bear against the wall of the furrow cut by the disk.

7. A wheelless disk plow comprising a plurality of rotatable plowing disks having circular cutting edges and concave faces, a rolling landside at the rear of each disk rotatable therewith and having a peripheral surface forming an angle with the face of the disk such that it bears against the wall of the furrow cut by said disk to absorb the side thrust of the plow, and draft connections for pulling the plow.

8. A wheelless disk plow comprising a plurality of rotatable plowing disks having circular cutting edges and concave faces, a circular landside member at the rear of each disk and rotatable therewith, each of said landside members having a landside surface at an angle to the face of the disk to contact the wall of the furrow cut by its disk to absorb the side thrust of the plow, each of said landside members also being of sufficient weight to cause substantial penetration of its plowing disk, and draft connections for pulling the plow.

9. A disk plow comprising a plurality of circular disks mounted on a common shaft to rotate in unison, each of said disks having a concave face and a circular cutting edge, a rolling landside associated with each of said disks, each of said landsides having a peripheral surface forming an angle with the face of its cutting disk and located so as to contact the wall of the furrow cut by its disk to absorb the side thrust on the plow, and draft connections attached to the disk shaft for pulling the plow.

10. A disk plow comprising a plurality of circular disks mounted on a common shaft to rotate in unison, a rolling landside for each of said disks mounted on said shaft to rotate with the disks, each of said landsides being relatively heavy to cause the disks to penetrate the soil and each having a peripheral surface formed at an angle so as to contact the wall of the furrow cut by its disk to absorb the side thrust of the plow, and draft connections attached to said shaft for pulling the plow.

11. A disk plow comprising a plurality of relatively thin cutting disks having polygonal openings, each of said disks having a concave face and a circular cutting edge, a rolling landside for each of said disks, each of said landsides comprising a metal disk having a polygonal opening and each being positioned to the rear of its respective cutting disk, said landsides being relatively heavy to cause the cutting disks to penetrate the ground and each of them having a peripheral surface at an angle to its cutting disk to contact the wall of the furrow cut by its disk to absorb the side thrust of the plow, spacing collars between each cutting disk and the landside of the adjacent disk, each of said collars having polygonal openings therethrough, a shaft of polygonal cross section extending through the openings in the cutting disks, the landsides and the spacing collars, means for clamping the disks, landsides, and spacing collars together on said shaft, and draft connections attached to the shaft for pulling the plow.

12. A disk plow comprising a plurality of relatively thin metal disks having concave faces and circular cutting edges, a polygonal shaft on which said disks are mounted to rotate in unison, a rolling landside for each disk, each of said landsides being mounted on the shaft to the rear of its respective cutting disk, a spacing collar between each disk and the landside of the adjacent disk, means for holding the disk, the landsides, and the collars on the shaft, bearings on the shaft, standards extending vertically upward from said bearings, a cross member carried by said standards above the row of disks, a semi-circular draft member extending forward from said cross piece, and a draft bar pivoted to the cross bar and adjustably connected to the semi-circular member.

In testimony whereof, I have subscribed my name.

BRADFORD COX.

CERTIFICATE OF CORRECTION.

Patent No. 1,698,188.                    Granted January 8, 1929, to

BRADFORD COX.

It is hereby certified that error appears in the printed specification of the above numbered patent requiring correction as follows: Page 4, line 29, claim 4, for the word "shaft" read "draft"; and that the said Letters Patent should be read with this correction therein that the same may conform to the record of the case in the Patent Office.

Signed and sealed this 5th day of February, A. D. 1929.

(Seal)

M. J. Moore,
Acting Commissioner of Patents.